United States Patent
Liu et al.

(10) Patent No.: US 10,075,331 B2
(45) Date of Patent: Sep. 11, 2018

(54) METHOD FOR CONFIGURING PHYSICAL CHANNEL START SYMBOLS, BASE STATION AND USER EQUIPMENT

(71) Applicant: SHARP KABUSHIKI KAISHA, Sakai, Osaka (JP)

(72) Inventors: Renmao Liu, Shanghai (CN); Xingya Shen, Shanghai (CN); Qi Jiang, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 98 days.

(21) Appl. No.: 15/329,918

(22) PCT Filed: Jul. 27, 2015

(86) PCT No.: PCT/CN2015/085176
§ 371 (c)(1),
(2) Date: Jan. 27, 2017

(87) PCT Pub. No.: WO2016/015609
PCT Pub. Date: Feb. 4, 2016

(65) Prior Publication Data
US 2017/0257264 A1  Sep. 7, 2017

(30) Foreign Application Priority Data

Jul. 30, 2014 (CN) .......................... 2014 1 0370770

(51) Int. Cl.
*H04L 12/24* (2006.01)
*H04W 72/04* (2009.01)
(Continued)

(52) U.S. Cl.
CPC ...... *H04L 41/0803* (2013.01); *H04L 27/2626* (2013.01); *H04W 4/70* (2018.02);
(Continued)

(58) Field of Classification Search
None
See application file for complete search history.

(56) References Cited

U.S. PATENT DOCUMENTS

2012/0327895 A1  12/2012  Wallén et al.
2013/0208647 A1*  8/2013  Kottkamp ............. H04W 74/08
370/312
(Continued)

FOREIGN PATENT DOCUMENTS

CN  103716841 A  4/2014

OTHER PUBLICATIONS

Ericsson et al., "New Work Item on Even Lower Complexity and Enhanced Coverage LTE UE for MTC", RP-140990, 3GPP TSG RAN Meeting #64, Sophia Antipolis, France, Jun. 10-13, 2014, item #14.1.1, 7 pgs.

*Primary Examiner* — Anh Ngoc M Nguyen
(74) *Attorney, Agent, or Firm* — Birch, Stewart, Kolasch & Birch, LLP

(57) ABSTRACT

The present disclosure provides a base station. The base station comprises: a transmitting unit configured to transmit a Machine Type Communication (MTC) Physical Downlink Control Channel (M-PDCCH) and Physical Downlink Shared Channels (PDSCHs). A start Orthogonal Frequency Division Multiplexing (OFDM) symbol of a PDSCH carrying First System Information Broadcast (SIB1) is preconfigured. Respective start OFDM symbols of the M-PDCCH and other PDSCHs are configured via the SIB1. The present disclosure also provides a User Equipment (UE) and associated methods.

8 Claims, 7 Drawing Sheets

(51) Int. Cl.
*H04W 74/08* (2009.01)
*H04L 27/26* (2006.01)
*H04W 4/70* (2018.01)
*H04W 88/08* (2009.01)
*H04W 68/02* (2009.01)
*H04W 88/02* (2009.01)
*H04W 76/27* (2018.01)

(52) U.S. Cl.
CPC ..... *H04W 72/042* (2013.01); *H04W 74/0833* (2013.01); *H04W 68/02* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2014/0056244 A1* | 2/2014 | Frenne | H04L 5/0053 370/329 |
| 2014/0307698 A1* | 10/2014 | Beale | H04L 5/0044 370/329 |
| 2015/0139422 A1* | 5/2015 | Jover | H04W 12/04 380/270 |
| 2015/0256403 A1 | 9/2015 | Li et al. | |

* cited by examiner

METHOD FOR CONFIGURING PHYSICAL CHANNEL START SYMBOLS, BASE STATION AND USER EQUIPMENT

TECHNICAL FIELD

The present disclosure relates to wireless communications, and more particularly, to a method for configuring physical channel start symbols, a base station and a User Equipment (UE).

BACKGROUND

With the rapid growth of mobile communications and the enormous development of technology, the world is evolving towards a network society with full connectivity. That is, anyone or anything can obtain information and share data anytime and anywhere. It is expected that, by 2020, there will be 50 billion of interconnected devices, among which only 10 billion will be mobile phones and tablet computers, while others are machines that do not interact with human, but with each other. Hence, there is a topic worth comprehensive research regarding how to design the system to support a huge number of machine communication devices.

In the Long Term Evolution (LTE) standard in the 3$^{rd}$ Generation Partner Project (3GPP), such machine-to-machine communication is referred to as Machine Type Communication (MTC). The MTC is a data communication service without human involvement. A large-scale deployment of MTC UEs can be applied to various fields such as security, tracking, payment, measurement, consumer electronics, and in particular to applications such as video surveillance, supply chain tracking, intelligent metering and remote monitoring. The MTC requires low power consumption and supports low data transmission rate and low mobility. Currently, the LTE system is mainly designed for Human-to-Human (H2H) communication services. Hence, in order to achieve the scale benefit and application prospect of the MTC services, it is important for the LTE network to support the MTC devices to operate at low cost.

Further, some MTC devices are mounted in basements of residential buildings or locations protected by insulating films, metal windows or thick walls of traditional buildings. These devices will suffer significantly higher penetration loss in air interface than conventional device terminals, such as mobile phones and tablets, in the LTE network. The 3GGP has started researches on solution designs and performance evaluations for MTC devices with a 20 dB of additional coverage enhancement. It is to be noted that an MTC device located in an area with poor network coverage has a very low data transmission rate, a very loose delay requirement and a limited mobility. For these MTC characteristics, some signaling and/or channels of the LTE network can be further optimized to better support the MTC services.

For this purpose, in the 3GPP RAN #64 meetings in June, 2014, a new work item for Rel-13 has been proposed for the low complexity and enhanced coverage MTC (see non-patent document: RP-140990, New Work Item on Even Lower Complexity and Enhanced Coverage LTE UE for MTC, Ericsson, NSN). In the description of this work item, the LTE Rel-13 system shall allow MTC UEs supporting 1.4 MHz RF bandwidth in UL/DL (referred to as narrowband MTC UE) to operate over any system bandwidth (e.g., 1.4 MHz, 3 MHz, 5 MHz, 10 MHz, 15 MHz, 20 MHz, etc.). In the existing LTE system, an LTE UE can obtain a start Orthogonal Frequency Division Multiplexing (OFDM) symbol of a Physical Downlink Shared Channel (PDSCH) or Enhanced Physical Downlink Control Channel (EPDCCH) from a broadband Physical Control Format Indicator Channel (PCFICH), so as to decode the corresponding PDSCH or EPDCCH. However, a narrowband MTC UE cannot read the broadband PDFICH information. Accordingly, in accordance with the existing LTE standard specifications, a narrowband MTC UE cannot obtain a start OFDM symbol of PDSCH or EPDCCH from PCFICH, and thus cannot decode the corresponding PDSCH or EPDCCH.

There is thus a need for a new solution for a narrowband MTC UE to obtain a start OFDM symbol of PDSCH or EPDCCH.

SUMMARY

It is an object of the present disclosure to provide methods for configuring/obtaining a start OFDM symbol of PDSCH or EPDCCH, a base station and a UE.

In particular, in an aspect of the present disclosure, a base station is provided. The base station comprises: a transmitting unit configured to transmit a Machine Type Communication (MTC) Physical Downlink Control Channel (M-PDCCH) and Physical Downlink Shared Channels (PDSCHs). A start Orthogonal Frequency Division Multiplexing (OFDM) symbol of a PDSCH carrying First System Information Broadcast (SIB1) is preconfigured. Respective start OFDM symbols of the M-PDCCH and other PDSCHs are configured via the SIB1.

In an embodiment, the start OFDM symbol of a PDSCH carrying SIB is "$1_{SIBStart}$", the start OFDM symbol of a PDSCH carrying paging information is "$1_{PagingStart}$", the start OFDM symbol of a PDSCH carrying a random access response is "$1_{Msg2Start}$", the start OFDM symbol of a PDSCH carrying user data is "$1_{DataStart}$", and the start OFDM symbol of the M-PDCCH is "$1_{MPDCCHStart}$".

In an embodiment, $1_{SIBStart}$, $1_{PagingStart}$, $1_{Msg2Start}$ and/or $1_{DataStart}$ and/or $1_{MPDCCHStart}$ are preconfigured.

In an embodiment, $1_{SIBStart}$, $1_{PagingStart}$, $1_{Msg2Start}$ and/or $1_{DataStart}$ and/or $1_{MPDCCHStart}$ are configured via a Master Information Block (MIB).

In an embodiment, $1_{SIBStart}$ of the PDSCH is preconfigured, and $1_{PagingStart}$, $1_{Msg2Start}$ and/or $1_{DataStart}$ and/or $1_{MPDCCHStart}$ are configured via an MIB.

In an embodiment, $1_{SIBStart}$ and $1_{PagingStart}$ of the PDSCHs are preconfigured, and b $1_{Msg2Start}$ and/or $1_{DataStart}$ and/or $1_{MPDCCHStart}$ are configured via an MIB.

In an embodiment, a start OFDM symbol of a PDSCH carrying First System Information Broadcast (SIB1) and a start OFDM symbol of a PDSCH carrying Second System Information Broadcast (SIB2) are preconfigured or configured via an MIB, and the respective start OFDM symbols of the PDSCHs carrying other SIBs, $1_{SIBStart}$, $1_{PagingStart}$, $1_{Msg2Start}$ and/or $1_{DataStart}$ and/or $1_{MPDCCHStart}$ are configured via the SIB2.

In an embodiment, $1_{SIBStart}$ of the PDSCH is preconfigured or configured by a Physical Broadcast Channel (PBCH) transmitting processing unit via an MIB, and $1_{PagingStart}$, $1_{Msg2Start}$ and/or $1_{DataStart}$ and/or $1_{MPDCCHStart}$ are configured via the SIB1 or SIB2.

In an embodiment, a PDSCH carrying information other than SIB, paging and Msg2 information and/or data, and/or an EPDCCH for scheduling that PDSCH, are transmitted using $1_{Msg2Start}$ or a default start OFDM symbol, until a new start OFDM symbol is successfully configured for a User Equipment (UE) via specific Radio Resource Control (RRC) signaling.

In an embodiment, respective values of $1_{SIBStart}$, $1_{PagingStart}$, $1_{Msg2Start}$, $1_{DataStart}$ and $1_{MPDCCHStart}$ are all the same, partly the same, or different from each other.

In another aspect of the present disclosure, a User Equipment (UE) is provided. The UE comprises: a receiving unit configured to receive a Machine Type Communication (MTC) Physical Downlink Control Channel (M-PDCCH) and Physical Downlink Shared Channels (PDSCHs). A start Orthogonal Frequency Division Multiplexing (OFDM) symbol of a PDSCH carrying First System Information Broadcast (SIB1) is preconfigured. Respective start OFDM symbols of the M-PDCCH and other PDSCHs are obtained via the SIB1.

In an embodiment, the start OFDM symbol of a PDSCH carrying SIB is "$1_{SIBStart}$", the start OFDM symbol of a PDSCH carrying paging information is "$1_{PagingStart}$", the start OFDM symbol of a PDSCH carrying a random access response is "$1_{Msg2Start}$", the start OFDM symbol of a PDSCH carrying user data is "$1_{DataStart}$", and the start OFDM symbol of the M-PDCCH is "$1_{MPDCCHStart}$".

In an embodiment, $1_{SIBStart}$, $1_{PagingStart}$, $1_{Msg2Start}$ and/or $1_{DataStart}$ and/or $1_{MPDCCHStart}$ are obtained by means of preconfiguration.

In an embodiment, $1_{SIBStart}$, $1_{PagingStart}$, $1_{Msg2Start}$ and/or $1_{DataStart}$ and/or $1_{MPDCCHStart}$ are obtained via a Master Information Block (MIB).

In an embodiment, $1_{SIBStart}$ of the PDSCH is obtained by means of preconfiguration, and $1_{PagingStart}$, $1_{Msg2Start}$ and/or $1_{DataStart}$ and/or $1_{MPDCCHStart}$ are obtained via an MIB.

In an embodiment, $1_{SIBStart}$ and $1_{PagingStart}$ of the PDSCHs are obtained by means of preconfiguration, and $1_{Msg2Start}$ and/or $1_{DataStart}$ and/or $1_{MPDCCHStart}$ are obtained via an MIB.

In an embodiment, a start OFDM symbol of a PDSCH carrying First System Information Broadcast (SIB1) and a start OFDM symbol of a PDSCH carrying Second System Information Broadcast (SIB2) are obtained by means of preconfiguration or via an MIB, and the respective start OFDM symbols of the PDSCHs carrying other SIBs, $1_{SIBStart}$, $1_{PagingStart}$, $1_{Msg2Start}$ and/or $1_{DataStart}$ and/or $1_{MPDCCHStart}$ are obtained via the SIB2.

In an embodiment, $1_{SIBStart}$ of the PDSCH is obtained by means of preconfiguration or by a Physical Broadcast Channel (PBCH) receiving processing unit via an MIB, and $1_{PagingStart}$, $1_{Msg2Start}$ and/or $1_{DataStart}$ and/or $1_{MPDCCHStart}$ are obtained via the SIB1 or SIB2.

In an embodiment, a PDSCH carrying information other than SIB, paging and Msg2 information and/or data, and/or an EPDCCH for scheduling that PDSCH, are received using $1_{Msg2Start}$ or a default start OFDM symbol, until a new start OFDM symbol is successfully configured for a User Equipment (UE) via specific Radio Resource Control (RRC) signaling.

In an embodiment, respective values of $1_{SIBStart}$, $1_{PagingStart}$, $1_{Msg2Start}$, $1_{DataStart}$ and $1_{MPDCCHStart}$ are all the same, partly the same, or different from each other.

In another aspect of the present disclosure, a method performed by a base station is provided. The method comprises: preconfiguring a start Orthogonal Frequency Division Multiplexing (OFDM) symbol of a Physical Downlink Shared Channel (PDSCH) carrying First System Information Broadcast (SIB1); and configuring respective start OFDM symbols of a Machine Type Communication (MTC) Physical Downlink Control Channel (M-PDCCH) and other PDSCHs via the SIB1.

In an embodiment, the start OFDM symbol of a PDSCH carrying SIB is "$1_{SIBStart}$", the start OFDM symbol of a PDSCH carrying paging information is "$1_{PagingStart}$", the start OFDM symbol of a PDSCH carrying a random access response is "$1_{Msg2Start}$", the start OFDM symbol of a PDSCH carrying user data is "$1_{DataStart}$", and the start OFDM symbol of the M-PDCCH is "$1_{MPDCCHStart}$".

In an embodiment, $1_{SIBStart}$, $1_{PagingStart}$, $1_{Msg2Start}$ and/or $1_{DataStart}$ and/or $1_{MPDCCHStart}$ are preconfigured.

In an embodiment, $1_{SIBStart}$, $1_{PagingStart}$, $1_{Msg2Start}$ and/or $1_{DataStart}$ and/or $1_{MPDCCHStart}$ are configured via a Master Information Block (MIB).

In an embodiment, $1_{SIBStart}$ of the PDSCH is preconfigured, and $1_{PagingStart}$, $1_{Msg2Start}$ and/or $1_{DataStart}$ and/or $1_{MPDCCHStart}$ are configured via an MIB.

In an embodiment, $1_{SIBStart}$ and $1_{PagingStart}$ of the PDSCHs are preconfigured, and $1_{Msg2Start}$ and/or $1_{DataStart}$ and/or $1_{MPDCCHStart}$ are configured via an MIB.

In an embodiment, a start OFDM symbol of a PDSCH carrying First System Information Broadcast (SIB1) and a start OFDM symbol of a PDSCH carrying Second System Information Broadcast (SIB2) are preconfigured or configured via an MIB, and the respective start OFDM symbols of the PDSCHs carrying other SIBs, $1_{SIBStart}$, $1_{PagingStart}$, $1_{Msg2Start}$ and/or $1_{DataStart}$ and/or $1_{MPDCCHStart}$ are configured via the SIB2.

In an embodiment, $1_{SIBStart}$ of the PDSCH is preconfigured or configured via an MIB, and $1_{PagingStart}$, $1_{Msg2Start}$ and/or $1_{DataStart}$ and/or $1_{MPDCCHStart}$ are configured via the SIB1 or SIB2.

In an embodiment, a PDSCH carrying information other than SIB, paging and Msg2 information and/or data, and/or an EPDCCH for scheduling that PDSCH, are transmitted using $1_{Msg2Start}$ or a default start OFDM symbol, until a new start OFDM symbol is successfully configured for a User Equipment (UE) via specific Radio Resource Control (RRC) signaling.

In an embodiment, respective values of $1_{SIBStart}$, $1_{PagingStart}$, $1_{Msg2Start}$, $1_{DataStart}$ and $1_{MPDCCHStart}$ are all the same, partly the same, or different from each other.

In another aspect of the present disclosure, a method performed by a User Equipment (UE) is provided. The method comprises: preconfiguring a start Orthogonal Frequency Division Multiplexing (OFDM) symbol of a Physical Downlink Shared Channel (PDSCH) carrying First System Information Broadcast (SIB1); and obtaining respective start OFDM symbols of a Machine Type Communication (MTC) Physical Downlink Control Channel (M-PDCCH) and other PDSCHs via the SIB1.

In an embodiment, the start OFDM symbol of a PDSCH carrying SIB is "$1_{SIBStart}$", the start OFDM symbol of a PDSCH carrying paging information is "$1_{PagingStart}$", the start OFDM symbol of a PDSCH carrying a random access response is "$1_{Msg2Start}$", the start OFDM symbol of a PDSCH carrying user data is "$1_{DataStart}$", and the start OFDM symbol of the M-PDCCH is "$1_{MPDCCHStart}$".

In an embodiment, $1_{SIBStart}$, $1_{PagingStart}$, $1_{Msg2Start}$ and/or $1_{DataStart}$ and/or $1_{MPDCCHStart}$ are obtained by means of preconfiguration.

In an embodiment, $1_{SIBStart}$, $1_{PagingStart}$, $1_{Msg2Start}$ and/or $1_{DataStart}$ and/or $1_{MPDCCHStart}$ are obtained via a Master Information Block (MIB).

In an embodiment, $1_{SIBStart}$ of the PDSCH is obtained by means of preconfiguration, and $1_{PagingStart}$, $1_{Msg2Start}$ and/or $1_{DataStart}$ and/or $1_{MPDCCHStart}$ are obtained via an MIB.

In an embodiment, $1_{SIBStart}$ and $1_{PagingStart}$ of the PDSCHs are obtained by means of preconfiguration, and $1_{Msg2Start}$ and/or $1_{DataStart}$ and/or $1_{MPDCCHStart}$ are obtained via an MIB.

In an embodiment, a start OFDM symbol of a PDSCH carrying First System Information Broadcast (SIB1) and a start OFDM symbol of a PDSCH carrying Second System Information Broadcast (SIB2) are obtained by means of preconfiguration or via an MIB, and the respective start OFDM symbols of the PDSCHs carrying other SIBS, $1_{SIBStart}$, $1_{PagingStart}$, $1_{Msg2Start}$ and/or $1_{DataStart}$ and/or $1_{MPDCCHStart}$ are obtained via the SIB2.

In an embodiment, $1_{SIBStart}$ of the PDSCH is obtained by means of preconfiguration or) via an MIB, and $1_{PagingStart}$, $1_{Msg2Start}$ and/or $1_{DataStart}$ and/or $1_{MPDCCHStart}$ are obtained via the SIB1 or SIB2.

In an embodiment, a PDSCH carrying information other than SIB, paging and Msg2 information and/or data, and/or an EPDCCH for scheduling that PDSCH, are received using $1_{Msg2Start}$ or a default start OFDM symbol, until a new start OFDM symbol is successfully configured for a User Equipment (UE) via specific Radio Resource Control (RRC) signaling.

In an embodiment, respective values of $1_{SIBStart}^1$, $1_{SIBStart}^2$, $1_{SIBStart}$, $1_{PagingStart}$, $1_{Msg2Start}$, $1_{DataStart}$ and $1_{MPDCCHStart}$ are all the same, partly the same, or different from each other.

BRIEF DESCRIPTION OF THE DRAWINGS

The above and other objects, features and advantages will be more apparent from the following description of embodiments with reference to the figures, in which.

DETAILED DESCRIPTION

In the following, preferred embodiments of the present disclosure will be described in detail with reference to the drawings. It should be noted that the following embodiments are illustrative only, rather than limiting the scope of the present disclosure. In the following description, details of well known techniques which are not directly relevant to the present invention will be omitted so as not to obscure the concept of the invention.

In the following, a number of embodiments of the present invention will be detailed in an exemplary application environment of LTE mobile communication system and its subsequent evolutions. Herein, it is to be noted that the present invention is not limited to the application exemplified in the embodiments. Rather, it is applicable to other communication systems, such as the future 5G cellular communication system.

Figure 1:
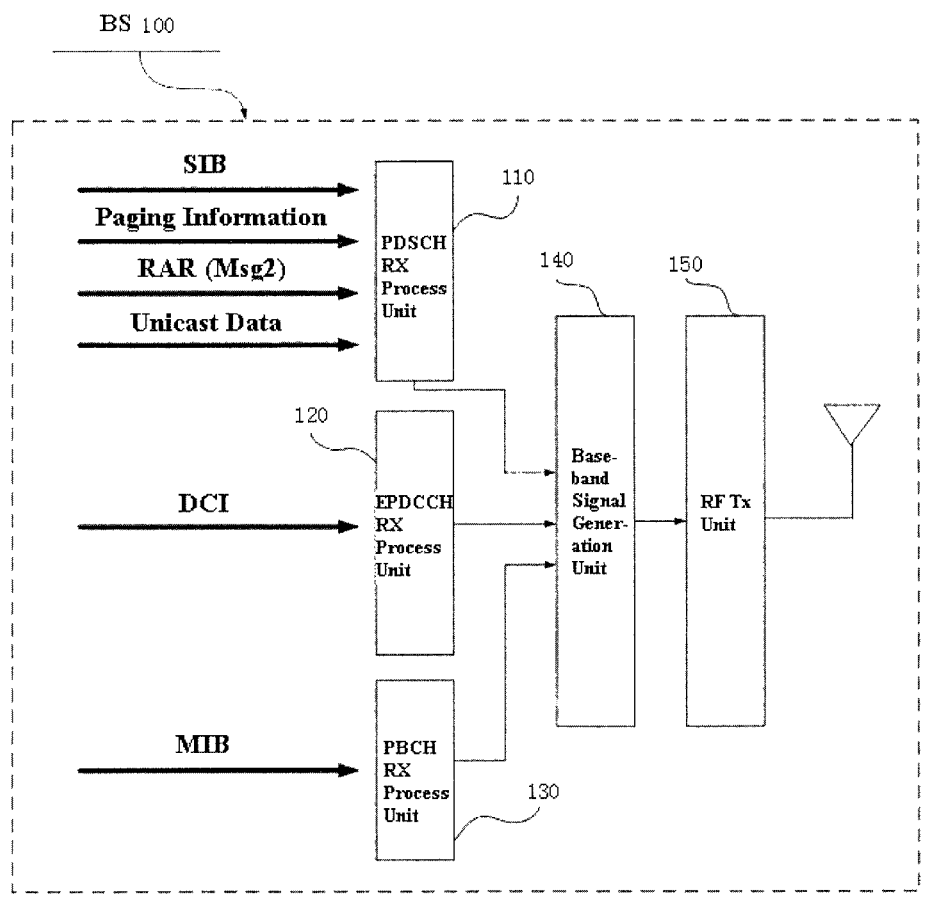
FIG. 1 is a block diagram of a base station according to the present disclosure.

FIG. 1 is a block diagram of a base station 100 according to the present disclosure. As shown, the base station 100 includes a Physical Downlink Shared Channel (PDSCH) transmission processing unit 110, an Enhanced Physical Downlink Control Channel (EPDCCH) transmission processing unit 120 and a Physical Broadcast Channel (PBCH) transmission processing unit 130. Further, the base station 100 can include a baseband signal generation unit 140 and a Radio Frequency (RF) transmitting unit 150. Alternatively, the base station includes a transmitting unit configured to transmit a Machine Type Communication (MTC) Physical Downlink Control Channel (M-PDCCH) and Physical Downlink Shared Channels (PDSCHs). A start Orthogonal Frequency Division Multiplexing (OFDM) symbol of a PDSCH carrying First System Information Broadcast (SIB1) is preconfigured. Respective start OFDM symbols of the M-PDCCH and other PDSCHs are configured via the SIB1. It can be appreciated by those skilled in the art that the base station 100 can further include other functional units necessary for achieving its functions, e.g., various processors, memories, RF receiving units, baseband signal extraction units, physical uplink channel reception processing units, other physical downlink channel transmission processing units, and the like. However, for the purpose of illustration, details of these well-known elements (including the baseband signal generation unit 140 and the RF transmitting unit 150) will be omitted.

Figure 2:
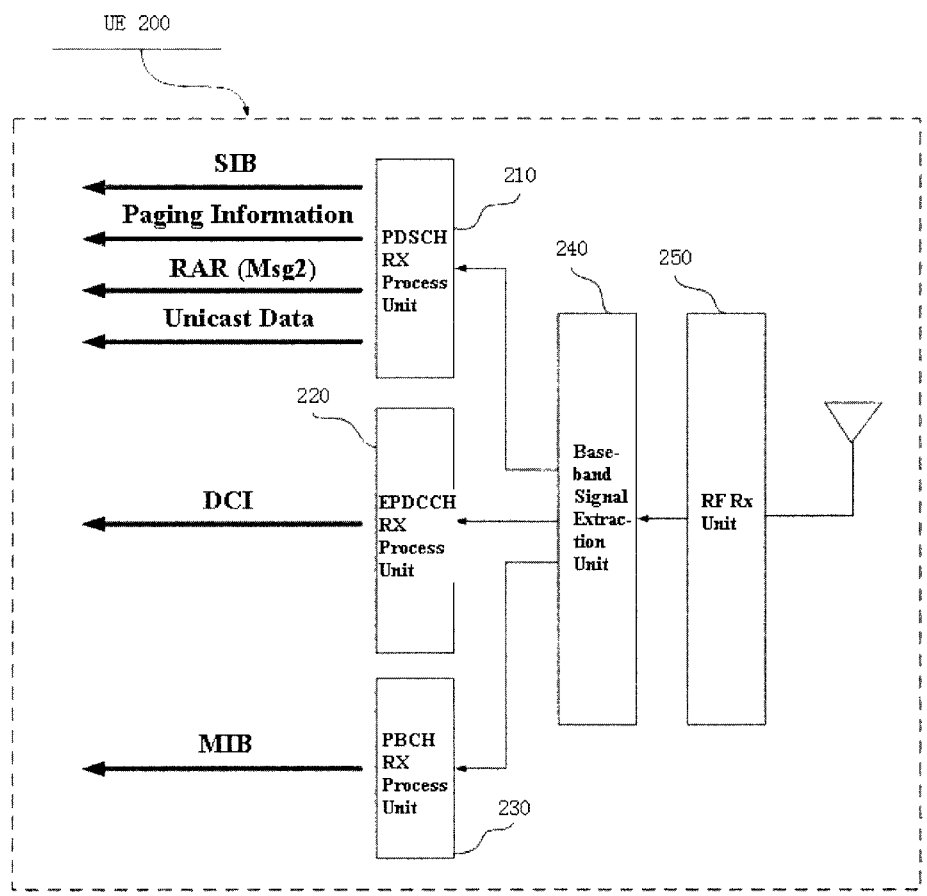
FIG. 2 is a block diagram of a UE according to the present disclosure.

FIG. 2 is a block diagram of a UE 200 according to the present disclosure. As shown, the UE 200 includes a PDSCH reception processing unit 210, an EPDCCH reception processing unit 220 and a PBCH reception processing unit 230. Further, the UE 200 can include a RF receiving unit 250 and a baseband signal extracting unit 240. Alternatively, the UE includes a receiving unit configured to receive a Machine Type Communication (MTC) Physical Downlink Control Channel (M-PDCCH) and Physical Downlink Shared Channels (PDSCHs). A start Orthogonal Frequency Division Multiplexing (OFDM) symbol of a PDSCH carrying First System Information Broadcast (SIB1) is preconfigured. Respective start OFDM symbols of the M-PDCCH and other PDSCHs are obtained via the SIB1. It can be appreciated by those skilled in the art that the UE 200 can further include other functional units necessary for achieving its functions, e.g., various processors, memories, RF transmitting units, baseband signal generation units, physical uplink channel transmission processing units, other physical downlink channel reception processing units, and the like. However, for the purpose of illustration, details of these well-known elements (including the RF receiving unit 250 and the baseband signal extracting unit 240) will be omitted.

The PDSCHs mainly carry system information (SIB), paging information, Random Access Response (RAR) and unicast data. On one hand, a narrowband MTC UE cannot obtain a start OFDM symbol of a PDSCH by receiving PCFICH. Therefore, it is required to design a new solution for obtaining the start OFDM symbol of PDSCH carrying the SIB, paging information, RAR or unicast data. On the other hand, a narrowband MTC UE cannot obtain resource allocation and other control information for PDSCHs from PDCCH. There are two solutions for transmission of PDSCHs for a narrowband MTC UE. First, a Machine Type Communication (MTC) Physical Downlink Control Channel (M-PDCCH), i.e., a narrowband EPDCCH, can be used to carry resource allocation and other control information for PDSCHs. Second, PDSCHs can be transmitted without physical downlink control channel (i.e., PDCCH or M-PDCCH). The existing LTE system has a dedicated EPDCCH (i.e., an EPDCCH specific to a UE), but does not define any common EPDCCH (e.g., EPDCCH for transmission of common information such as SIB, paging and RAR). Hence, for the first solution, a common M-PDCCH (narrowband EPDCCH) is required for carrying resource allocation and other control information for PDSCHs. It is to be noted here that the common M-PDCCH (narrowband EPDCCH) does not only refer to the EPDCCH designed for the existing LTE architecture, but also to any physical downlink control channel for scheduling PDSCHs carrying SIB, paging or RAR information. For the second solution, resource allocation and other control information for PDSCHs of a narrowband MTC UE can be preconfigured and/or carried or configured by Master Information Block (MIB) and/or SIBx and/or Msg2 and/or specific Radio Resource Control (RRC) signaling. Here, SIBx refers to one of SIBs such as SIB1, SIB2 or SIB3, Msg2 refers to RAR information which may include one or more RARs.

Figure 3:
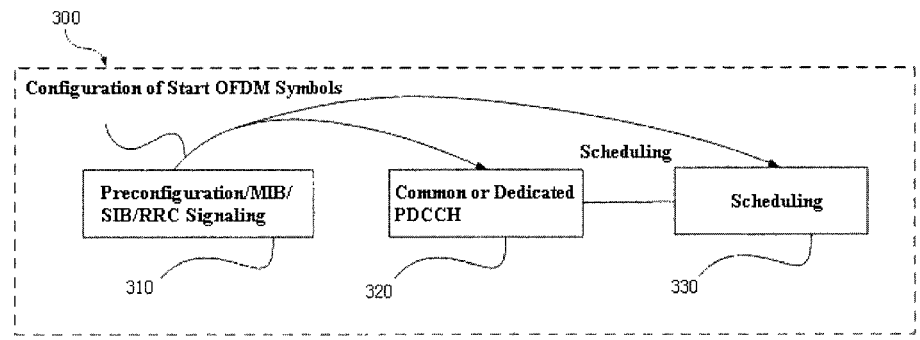
FIG. 3 shows an overview of configuration of start OFDM symbols according to the present disclosure.

As shown in FIG. 3, there are mainly four schemes for configuring respective start OFDM symbols of PDSCHs and a common or dedicated M-PDCCH (EPDCCH): preconfiguration, configuration via MIB, configuration via SIB, and configuration via RRC. The PDSCHs include a PDSCH carrying SIB for a narrowband MTC UE, a PDSCH carrying paging information for a narrowband MTC UE, a PDSCH carrying a RAR for a narrowband MTC UE, and a PDSCH carrying data for a narrowband MTC UE. Various combinations of the above four schemes can be utilized to configure the start OFDM symbol of the PDSCH carrying SIB for the narrowband MTC UE, $1_{SIBStart}$, the start OFDM symbol of the PDSCH carrying paging information for the narrowband MTC UE, $1_{PagingStart}$, the start OFDM symbol of the PDSCH carrying RAR for the narrowband MTC UE, $1_{Msg2Start}$, the start OFDM symbol of the PDSCH carrying data for the narrowband MTC UE, $1_{DataStart}$, and the start OFDM symbol of the common or dedicated M-PDCCH (EPDCCH), $1_{MPDCCHStart}$.

The number of OFDM symbols of the control channel as indicated in PCFICH by the base station (Control Format Indicator, or CFI, having a value belonging to {1, 2, 3}) may or may not be consistent with $1_{SIBStart}$, $1_{PagingStart}$, $1_{Msg2Start}$, $1_{DataStart}$ or $1_{MPDCCHStart}$. It is to be noted that the PCFICH indicates the number of OFDM symbols in a particular subframe that are used by the base station for PDCCH transmission, while $1_{SIBStart}$, $1_{PagingStart}$, $1_{Msg2Start}$, $1_{DataStart}$ and $1_{MPDCCHStart}$ indicate the start OFDM symbol of the PDSCH carrying SIB, the start OFDM symbol of the PDSCH carrying paging information, the start OFDM symbol of the PDSCH carrying RAR, the start OFDM symbol of the PDSCH carrying user data, and the start OFDM symbol of the common or dedicated M-PDCCH (EPDCCH), respectively. When the downlink bandwidth $N_{RB}^{DL}>10$ (the definition of $N_{RB}^{DL}$ can be seen in 3GPP TS 36.211 V11.3.0), the number of OFDM symbols used for PDCCH equals to the CFI value indicated in PCFICH (i.e., 1, 2 or 3). When the downlink bandwidth $N_{RB}^{DL} \leq 10$, the number of OFDM symbols used for PDCCH equals to the CFI value indicated in PCFICH plus 1 (i.e., 2, 3 or 4). The start OFDM symbol of a PDSCH refers to an index of the first OFDM symbol in a first slot of a subframe that is used for PDSCH transmission. For a normal Cyclic Prefix (CP), the number of OFDM symbols in a slot is $N_{symb}^{DL}=7$ (the definition of $N_{symb}^{DL}$ can be seen in 3GPP TS 36.211 V11.3.0), and the value of an OFDM symbol in the slot shall be $l=0, \ldots N_{symb}^{DL}-1$. In the existing LTE system, the start OFDM symbol of a PDSCH shall equal to the CFI value (when $N_{RB}^{DL}>10$) or the CFI value plus 1 (when $N_{RB}^{DL} \leq 10$). For example, when the number of OFDM symbols for a downlink control channel (i.e., the CFI value or the CFI value plus 1) is 2, the start OFDM symbol of its corresponding PDSCH shall be 2, i.e., the time domain symbols of the PDSCH start from the third OFDM symbol in the first slot.

In the following, the configurations of the start OFDM symbols of PDSCHs carrying different information or data and/or the start OFDM symbol of the common or dedicated M-PDCCH (EPDCCH) will be described with reference to the specific embodiments.

Embodiment 1

In this embodiment, the start OFDM symbol of the PDSCH carrying SIB, $1_{SIBStart}$, the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, are preconfigured.

In this embodiment, each of $1_{SIBStart}$, $1_{PagingStart}$, $1_{Msg2Start}$, $1_{DataStart}$ and $1_{MPDCCHStart}$ belongs to {1, 2, 3, 4} and their values can be configured to be all the same, partly the same and partly different, or different from each other. For example, the following configurations are possible:
$1_{SIBStart}=1_{PagingStart}=1_{Msg2Start}=1_{DataStart}=1_{MPDCCHStart}$,
$1_{SIBStart}=1_{PagingStart}=1_{Msg2Start}\neq 1_{DataStart}=1_{MPDCCHStart}$,
$1_{SIBStart}=1_{PagingStart}\neq 1_{Msg2Start}=1_{DataStart}=1_{MPDCCHStart}$,
$1_{SIBStart}\neq 1_{PagingStart}=1_{Msg2Start}=1_{DataStart}=1_{MPDCCHStart}$, or
$1_{SIBStart}\neq 1_{PagingStart}\neq 1_{Msg2Start}\neq 1_{DataStart}\neq 1_{MPDCCHStart}$.

Embodiment 2

In this embodiment, the base station (in particular, the PBCH transmission processing unit 130) configures the start OFDM symbol of the PDSCH carrying SIB, $1_{SIBStart}$, the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, via MIB.

For example, in the LTE system, the MIB contains in total 24 information bits, among which 14 bits are used and 10 bits are spare. The base station can use the spare bits in the MIB to configure $1_{SIBStart}$, $1_{PagingStart}$, $1_{Msg2Start}$, $1_{DataStart}$ and $1_{MPDCCHStart}$. Each of $1_{SIBStart}$, $1_{PagingStart}$, $1_{Msg2Start}$, $1_{DataStart}$ and $1_{MPDCCHStart}$ belongs to {1, 2, 3, 4} and their values can be configured to be all the same, partly the same and partly different, or different from each other. That is, different spare bits in the MIB can be used to indicate different start OFDM symbols.

Embodiment 3

Figure 4:
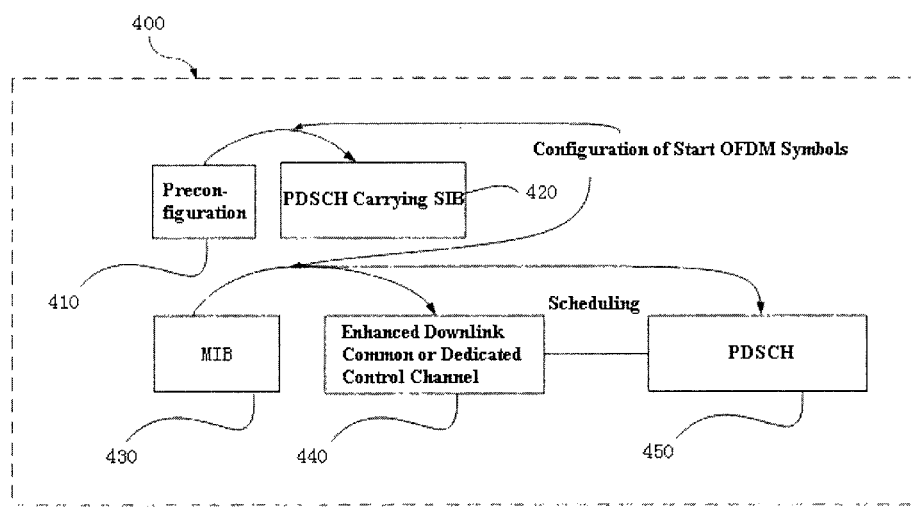
FIG. 4 is a schematic diagram showing configuration of start OFDM symbols preconfigured and configured via MIB.

As shown in FIG. 4, in this embodiment, the base station preconfigures and configures via MIB the start OFDM symbol of the PDSCH carrying SIB, $1_{SIBStart}$, the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$.

In particular, the start OFDM symbol of the PDSCH carrying SIB can be preconfigured. The PBCH transmission processing unit 130 can configure the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, via MIB.

Preferably, the start OFDM symbol of the PDSCH carrying SIB and the start OFDM symbol of the PDSCH carrying paging information, $1_{PagingStart}$, can be preconfigured. The PBCH transmission processing unit 130 can configure the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, via MIB.

In this embodiment, each of $1_{SIBStart}$, $1_{PagingStart}$, $1_{Msg2Start}$, $1_{DataStart}$ and $1_{MPDCCHStart}$ belongs to $\{1, 2, 3, 4\}$ and their values can be configured to be all the same, partly the same and partly different, or different from each other.

Embodiment 4

Figure 5:
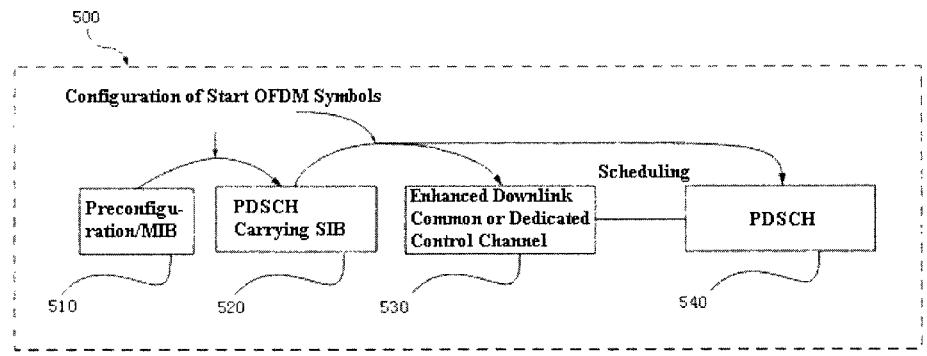
FIG. 5 is a schematic diagram showing configuration of start OFDM symbols preconfigured or configured via MIB and SIB.

As shown in FIG. 5, in this embodiment, the start OFDM symbol of the PDSCH carrying SIB, $1_{SIBStart}$, the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, are preconfigured or configured via MIB and SIBx.

In particular, the start OFDM symbol of the PDSCH carrying SIB1 can be preconfigured, or configured by the PBCH transmission processing unit 130 via MIB. Then, the start OFDM symbol of the PDSCH carrying other SIBs, $1_{SIBStart}^{1}$, the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, can be configured by the PDSCH transmission processing unit 110 via the SIB1.

Preferably, the start OFDM symbol of the PDSCH carrying SIB1 and the start OFDM symbol of the PDSCH carrying SIB2 can be preconfigured, or configured by the PBCH transmission processing unit 130 via MIB. Then, the start OFDM symbol of the PDSCH carrying other SIBs, $1_{SIBStart}^{2}$, the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, can be configured by the PDSCH transmission processing unit 110 via the SIB2.

Preferably, the start OFDM symbol of the PDSCH carrying SIB, $1_{SIBStart}$, can be preconfigured, or configured by the PBCH transmission processing unit 130 via MIB. Then, the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, can be configured by the PDSCH transmission processing unit 110 via the SIB1 or SIB2.

In this embodiment, each of $1_{SIBStart}^{1}$, $1_{SIBStart}^{2}$, $1_{SIBStart}$, $1_{PagingStart}$, $1_{Msg2Start}$, $1_{DataStart}$ and $1_{MPDCCHStart}$ belongs to $\{1, 2, 3, 4\}$ and their values can be configured to be all the same, partly the same and partly different, or different from each other.

Embodiment 5

Figure 6:
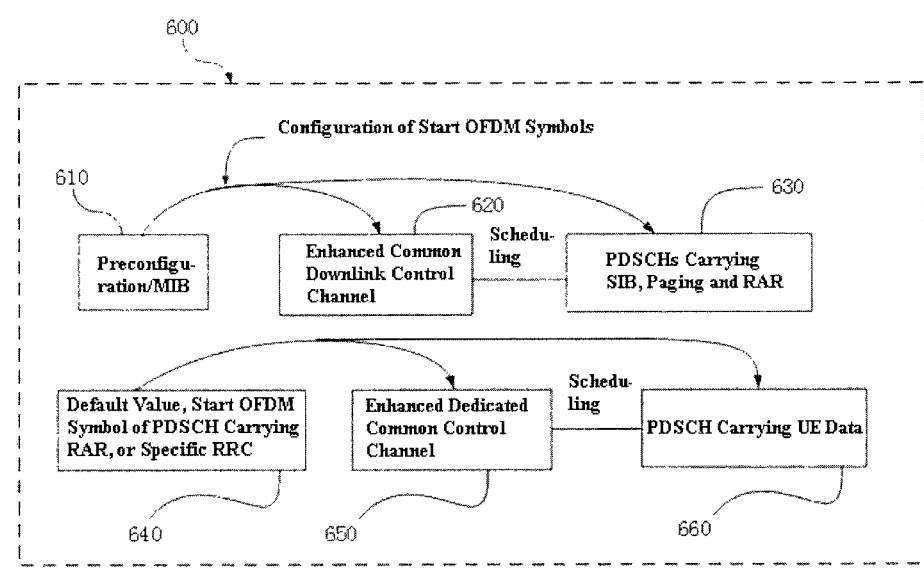
FIG. 6 is a schematic diagram showing configuration of start OFDM symbols preconfigured or configured via MIB and RRC signaling.

As shown in FIG. 6, in this embodiment, the start OFDM symbol of the PDSCH carrying SIB, $1_{SIBStart}$, the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, are preconfigured or configured via MIB and RRC signaling.

In particular, the start OFDM symbol of the PDSCH carrying SIB, $1_{SIBStart}$, the start OFDM symbol of the PDSCH carrying paging information, $1_{PagingStart}$, the start OFDM symbol of the PDSCH carrying RAR, $1_{Msg2Start}$, and the start OFDM symbol of the common or dedicated M-PDCCH (EPDCCH), $1_{MPDCCHStart}$, are preconfigured or configured by the PBCH transmission processing unit 130 via MIB. The narrowband MTC UE can receive a PDSCH carrying information other than SIB and paging information and/or data, and/or the M-PDCCH (EPDCCH) corresponding to that PDSCH, using $1_{Msg2Start}$ until the UE obtains a new start OFDM symbol configuration value via specific (dedicated or UE-specific) RRC signaling. After that, the UUE will receive user data using the start OFDM symbols of the M-PDCCH (EPDCCH) and/or PDSCH as configured by the specific RRC signaling.

Preferably, the start OFDM symbol of the PDSCH carrying SIB, $1_{SIBStart}$, the start OFDM symbol of the PDSCH carrying paging information, $1_{PagingStart}$, the start OFDM symbol of the PDSCH carrying RAR, b $1_{Msg2Start}$, and the start OFDM symbol of the common or dedicated M-PDCCH (EPDCCH), are preconfigured or configured by the PBCH transmission processing unit 130 via MIB. The narrowband MTC UE can receive a PDSCH carrying information other than SIB, paging and RAR information and/or data, and/or the M-PDCCH (EPDCCH) corresponding to that PDSCH, using a default start OFDM symbol of the PDSCH, until the UE obtains a new start OFDM symbol configuration value via specific RRC signaling. After that, the UUE will receive user data using the start OFDM symbols of the M-PDCCH (EPDCCH) and/or PDSCH as configured by the specific RRC signaling.

In this embodiment, each of $1_{SIBStart}$, $1_{PagingStart}$, $1_{Msg2Start}$, $1_{DataStart}$ and $1_{MPDCCHStart}$ belongs to $\{1, 2, 3, 4\}$ and their values can be configured to be all the same, partly the same and partly different, or different from each other.

Embodiment 6

Figure 7:
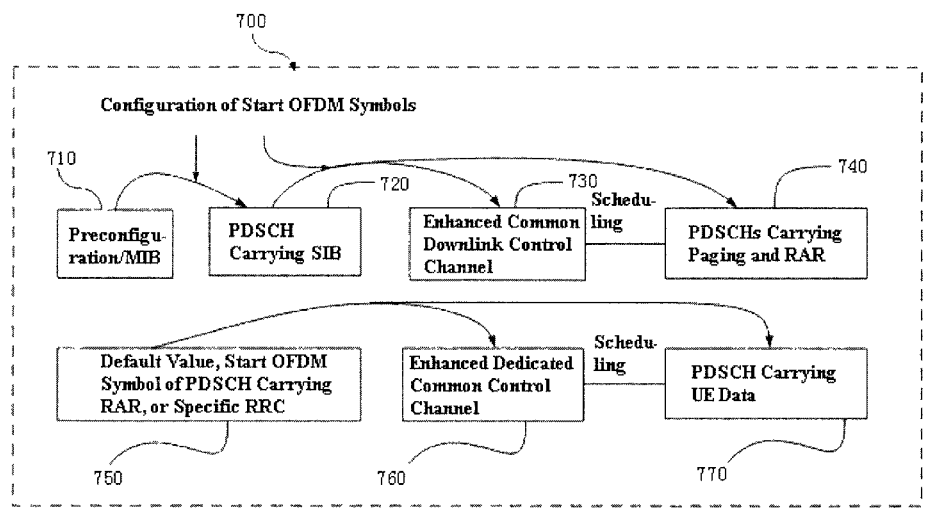
FIG. 7 is a schematic diagram showing configuration of start OFDM symbols preconfigured or configured via MIB and SIB and RRC signaling.

As shown in FIG. 7, in this embodiment, the start OFDM symbol of the PDSCH carrying SIB, $1_{SIBStart}$, the start OFDM symbol of the PDSCH carrying paging information, $1_{PagingStart}$, the start OFDM symbol of the PDSCH carrying RAR, $1_{Msg2Start}$, the start OFDM symbol of the PDSCH carrying user data, $1_{DataStart}$, and the start OFDM symbol of the common or dedicated M-PDCCH (EPDCCH), $1_{MPDCCHStart}$, are preconfigured or configured via MIB and SIB and RRC signaling.

In particular, the start OFDM symbol of the PDSCH carrying SIB1 can be preconfigured, or configured by the PBCH transmission processing unit 130 via MIB. Then, the start OFDM symbol of the PDSCH carrying other SIBs, $1_{SIBStart}^{1}$, the start OFDM symbol of the PDSCH carrying paging information, $1_{PagingStart}$, the start OFDM symbol of the PDSCH carrying RAR, $1_{Msg2Start}$, and the start OFDM symbol of the common or dedicated M-PDCCH (EPDCCH), can be configured by the PDSCH transmission processing unit 110 via the SIB1. The narrowband MTC UE can receive a PDSCH carrying information other than SIB and paging information and/or data, and/or the M-PDCCH (EPDCCH) corresponding to that PDSCH, using $1_{Msg2Start}$, until the UE obtains a new start OFDM symbol configuration value via specific (dedicated or UE-specific) RRC signaling. After that, the UUE will receive user data using the start OFDM symbols of the M-PDCCH (EPDCCH) and/or PDSCH as configured by the specific RRC signaling.

Preferably, the start OFDM symbol of the PDSCH carrying SIB1 can be preconfigured, or configured by the PBCH transmission processing unit 130 via MIB. Then, the start OFDM symbol of the PDSCH carrying other SIBs, $1_{SIBStart}^{1}$, the start OFDM symbol of the PDSCH carrying paging information, $1_{PagingStart}$, the start OFDM symbol of the PDSCH carrying RAR, $1_{Msg2Start}$, and the start OFDM symbol of the common or dedicated M-PDCCH (EPDCCH), can be configured by the PDSCH transmission processing unit 110 via the SIB1. The narrowband MTC UE can receive a PDSCH carrying information other than SIB, paging and RAR information and/or data, and/or the M-PDCCH (EPDCCH) corresponding to that PDSCH, using a default start OFDM symbol of the PDSCH, until the UE obtains a new start OFDM symbol configuration value via specific RRC signaling. After that, the UUE will receive user data using the start OFDM symbols of the M-PDCCH (EPDCCH) and/or PDSCH as configured by the specific RRC signaling.

Preferably, the start OFDM symbol of the PDSCH carrying SIB1 and the start OFDM symbol of the PDSCH carrying SIB2 can be preconfigured, or configured by the PBCH transmission processing unit 130 via MIB. Then, the start OFDM symbol of the PDSCH carrying other SIBs, $1_{SIBStart}^{2}$, the start OFDM symbol of the PDSCH carrying paging information, $1_{PagingStart}$, the start OFDM symbol of the PDSCH carrying RAR, $1_{Msg2Start}$, and the start OFDM symbol of the common or dedicated M-PDCCH (EPDCCH), can be configured by the PDSCH transmission processing unit 110 via the SIB2. The narrowband MTC UE can receive a PDSCH carrying information other than SIB and paging information and/or data, and/or the M-PDCCH (EPDCCH) corresponding to that PDSCH, using $1_{Msg2Start}$, until the UE obtains a new start OFDM symbol configuration value via specific (dedicated or UE-specific) RRC signaling. After that, the UUE will receive user data using the start OFDM symbols of the M-PDCCH (EPDCCH) and/or PDSCH as configured by the specific RRC signaling.

Preferably, the start OFDM symbol of the PDSCH carrying SIB1 and the start OFDM symbol of the PDSCH carrying SIB2 can be preconfigured, or configured by the PBCH transmission processing unit 130 via MIB. Then, the start OFDM symbol of the PDSCH carrying other SIBs, $1_{SIBStart}^{2}$, the start OFDM symbol of the PDSCH carrying paging information, $1_{PagingStart}$, the start OFDM symbol of the PDSCH carrying RAR, $1_{Msg2Start}$, and the start OFDM symbol of the common or dedicated M-PDCCH (EPDCCH), can be configured by the PDSCH transmission processing unit 110 via the SIB2. The narrowband MTC UE can receive a PDSCH carrying information other than SIB, paging and RAR information and/or data, and/or the M-PDCCH (EPDCCH) corresponding to that PDSCH, using a default start OFDM symbol of the PDSCH, until the UE obtains a new start OFDM symbol configuration value via specific RRC signaling, After that, the UUE will receive user data using the start OFDM symbols of the M-PDCCH (EPDCCH) and/or PDSCH as configured by the specific RRC signaling.

Preferably, the start OFDM symbol of the PDSCH carrying SIB, $1_{SIBStart}$, can be preconfigured, or configured by the PBCH transmission processing unit 130 via MIB. Then, the start OFDM symbol of the PDSCH carrying paging information, $1_{PagingStart}$, the start OFDM symbol of the PDSCH carrying RAR, $1_{Msg2Start}$, and the start OFDM symbol of the common or dedicated M-PDCCH (EPDCCH), can be configured by the PDSCH transmission processing unit 110 via the SIB1 or SIB2. The narrowband MTC UE can receive a PDSCH carrying information other than SIB and paging information and/or data, and/or the M-PDCCH (EPDCCH) corresponding to that PDSCH, using $1_{Msg2Start}$, until the UE obtains a new start OFDM symbol configuration value via specific (dedicated or UE-specific) RRC signaling. After that, the UUE will receive user data using the start OFDM symbols of the M-PDCCH (EPDCCH) and/or PDSCH as configured by the specific RRC signaling.

Preferably, the start OFDM symbol of the PDSCH carrying SIB, $1_{SIBStart}$, can be preconfigured, or configured by the PBCH transmission processing unit 130 via MIB. Then, the start OFDM symbol of the PDSCH carrying other SIBs, $1_{SIBStart}^{2}$, the start OFDM symbol of the PDSCH carrying paging information, $1_{PagingStart}$, the start OFDM symbol of the PDSCH carrying RAR, $1_{Msg2Start}$, and the start OFDM symbol of the common or dedicated M-PDCCH (EPDCCH), can be configured by the PDSCH transmission processing unit 110 via the SIB1 or SIB2. The narrowband MTC UE can receive a PDSCH carrying information other than SIB, paging and RAR information and/or data, and/or the M-PDCCH (EPDCCH) corresponding to that PDSCH, using a default start OFDM symbol of the PDSCH, until the UE obtains a new start OFDM symbol configuration value via specific RRC signaling. After that, the UUE will receive user data using the start OFDM symbols of the M-PDCCH (EPDCCH) and/or PDSCH as configured by the specific RRC signaling.

In this embodiment, each of $1_{SIBStart}^{1}$, $1_{SIBStart}^{2}$, $1_{SIBStart}$, $1_{PagingStart}$, $1_{Msg2Start}$, $1_{DataStart}$ and $1_{MPDCCHStart}$ belongs to $\{1, 2, 3, 4\}$ and their values can be configured to be all the same, partly the same and partly different, or different from each other.

For transmission of a physical downlink channel in a particular Transmission Time Interval (TTI), the relationship between the set the CFI value (when $N_{RB}^{DL} > 10$) or the CFI value plus 1 (when $N_{RB}^{DL} \leq 10$) and the start OFDM symbol of a PDSCH and/or the start OFDM symbol of a common and/or dedicated M-PDCCH (EPDCCH) as configured by the base station for the narrowband MTC UE shall satisfy the following requirements and the relevant behavior specifications for the base station and the narrowband MTC UE.

If the TTI includes a PDSCH transmission carrying SIB for the narrowband MTC UE, and the narrowband MTC UE shares the same SIB transmission with legacy LTE UEs, the CFI value (when $N_{RB}^{DL} > 10$) or the CFI value plus 1 (when $N_{RB}^{DL} \leq 10$) set by the base station shall equal to the start OFDM symbol of the PDSCH carrying the SIB as configured by the base station for the narrowband MTC UE. When the narrowband MTC UE receives the PDSCH carrying the SIB, it sets the start OFDM symbol of the PDSCH to $1_{SIBStart}$.

If the TTI includes a PDSCH transmission carrying SIB for the narrowband MTC UE, but the narrowband MTC UE does not share the same SIB transmission with legacy LTE UEs, i.e., the base station transmits separate SIB for the narrowband MTC UE, the CFI value (when $N_{RB}^{DL}>10$) or the CFI value plus 1 (when $N_{RB}^{DL}\leq 10$) set by the base station may not be equal to the start OFDM symbol of the PDSCH carrying the SIB as configured by the base station for the narrowband MTC UE. If the CFI value (when $N_{RB}^{DL}>10$) or the CFI value plus 1 (when $N_{RB}^{DL}\leq 10$) is smaller than or equal to $1_{SIBStart}$, the base station will start mapping Resource Elements (REs) of the PDSCH carrying SIB for the narrowband MTC UE from the start OFDM symbol $1_{SIBStart}$. If the CFI value (when $N_{RB}^{DL}>10$) or the CFI value plus 1 (when $N_{RB}^{DL}\leq 10$) is larger than $1_{SIBStart}$, the base station will start mapping REs of the PDSCH carrying SIB for the narrowband MTC UE from the start OFDM symbol $1_{SIBStart}$. However, the base station will puncture the REs of the PDSCH carrying SIB for the narrowband MTC UE that overlap a broadband PDCCH. When the narrowband MTC UE receives the PDSCH carrying the SIB, it sets the start OFDM symbol of the PDSCH to $1_{SIBStart}$.

If the TTI includes a PDSCH transmission carrying paging information for the narrowband MTC UE, a PDSCH transmission carrying RAR for the narrowband MTC UE, or a PDSCH transmission carrying data for the narrowband MTC UE, the CFI value (when $N_{RB}^{DL}>10$) or the CFI value plus 1 (when $N_{RB}^{DL}\leq 10$) set by the base station may not be equal to the start OFDM symbol of the PDSCH carrying the SIB as configured by the base station for the narrowband MTC UE. If the CFI value (when $N_{RB}^{DL}>10$) or the CFI value plus 1 (when $N_{RB}^{DL}\leq 10$) is smaller than or equal to $1_{PagingStart}$, $1_{Msg2Start}$ or $1_{DataStart}$, the base station will start mapping Resource Elements (REs) of the PDSCH carrying paging information for the narrowband MTC UE, the PDSCH transmission carrying RAR for the narrowband MTC UE, or the PDSCH transmission carrying data for the narrowband MTC UE, from the start OFDM symbol $1_{PagingStart}$, $1_{Msg2Start}$ or $1_{DataStart}$. If the CFI value (when $N_{RB}^{DL}>10$) or the CFI value plus 1 (when $N_{RB}^{DL}\leq 10$) is larger than $1_{SIBStart}$, the base station will start mapping REs of the PDSCH carrying paging information for the narrowband MTC UE, the PDSCH transmission carrying RAR for the narrowband MTC UE, or the PDSCH transmission carrying data for the narrowband MTC UE, from the start OFDM symbol $1_{PagingStart}$, $1_{Msg2Start}$ or $1_{DataStart}$. However, the base station will puncture the REs of the PDSCH carrying paging information for the narrowband MTC UE, the PDSCH transmission carrying RAR for the narrowband MTC UE, or the PDSCH transmission carrying data for the narrowband MTC UE that overlap a broadband PDCCH. When the narrowband MTC UE receives the of the PDSCH carrying paging information for the narrowband MTC UE, the PDSCH transmission carrying RAR for the narrowband MTC UE, or the PDSCH transmission carrying data for the narrowband MTC UE, it sets the OFDM symbol of the PDSCH to $1_{PagingStart}$, $1_{Msg2Start}$ or $1_{DataStart}$, respectively.

If the TTI includes a transmission of a common M-PDCCH (EPDCCH), a newly designed common PDCCH, another PDCCH or a dedicated M-PDCCH (EPDCCH), the CFI value (when $N_{RB}^{DL}>10$) or the CFI value plus 1 (when $N_{RB}^{DL}\leq 10$) set by the base station may not be equal to the start OFDM symbol of the above common M-PDCCH (EPDCCH), newly designed common PDCCH, other PDCCH or dedicated M-PDCCH (EPDCCH). If the CFI value (when $N_{RB}^{DL}>10$) or the CFI value plus 1 (when $N_{RB}^{DL}\leq 10$) is smaller than or equal to the start OFDM symbol of the above common M-PDCCH (EPDCCH), newly designed common PDCCH, other PDCCH or dedicated M-PDCCH (EPDCCH), the base station will start mapping Resource Elements (REs) of the above common M-PDCCH (EPDCCH), newly designed common PDCCH, other PDCCH or dedicated M-PDCCH (EPDCCH) from the start OFDM symbol of the above common M-PDCCH (EPDCCH), newly designed common PDCCH, other PDCCH or dedicated M-PDCCH (EPDCCH). If the CFI value (when $N_{RB}^{DL}>10$) or the CFI value plus 1 (when $N_{RB}^{DL}\leq 10$) is larger than the start OFDM symbol of the above common M-PDCCH (EPDCCH), newly designed common PDCCH, other PDCCH or dedicated M-PDCCH (EPDCCH), the base station will start mapping REs of the above common M-PDCCH (EPDCCH), newly designed common PDCCH, other PDCCH or dedicated M-PDCCH (EPDCCH) from the start OFDM symbol of the above common M-PDCCH (EPDCCH), newly designed common PDCCH, other PDCCH or dedicated M-PDCCH (EPDCCH). However, the base station will puncture the REs of the above common M-PDCCH (EPDCCH), newly designed common PDCCH, other PDCCH or dedicated M-PDCCH (EPDCCH) that overlap a broadband PDCCH. When the narrowband MTC UE receives the above common M-PDCCH (EPDCCH), newly designed common PDCCH, other PDCCH or dedicated M-PDCCH (EPDCCH), it sets the start OFDM symbol of the above common M-PDCCH (EPDCCH), newly designed common PDCCH, other PDCCH or dedicated M-PDCCH (EPDCCH) to the start OFDM symbol of the above common M-PDCCH (EPDCCH), newly designed common PDCCH, other PDCCH or dedicated M-PDCCH (EPDCCH) as configured for it in the above embodiment.

Figure 8:
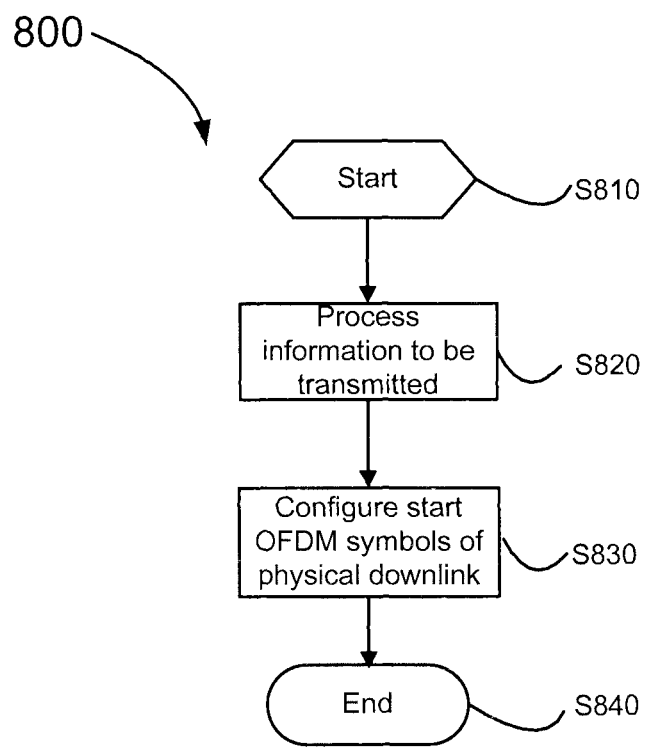
FIG. 8 is a flowchart illustrating a method in a base station for configuring start OFDM symbols according to the present disclosure.

FIG. 8 is a flowchart illustrating a method in a base station for configuring start OFDM symbols according to the present disclosure. As shown in FIG. 8, the method 800 starts with step S810.

At step S820, the base station processes information to be transmitted. In particular, the base station processes SIB, paging information, RAR and user data that are to be transmitted, downlink control information to be transmitted, and MIB to be transmitted.

At step S830, the base station configures start OFDM symbols of physical downlink channels. In particular, a start OFDM symbol of a PDSCH carrying SIB, $1_{SIBStart}$, a start OFDM symbol of a PDSCH carrying paging information, $1_{PagingStart}$, a start OFDM symbol of a PDSCH carrying a random access response, $1_{Msg2Start}$, a start OFDM symbol of a PDSCH carrying user data, $1_{DataStart}$, and a start OFDM symbol of a common or dedicated M-PDCCH (EPDCCH), $1_{MPDCCHStart}$, is configured for a narrowband MTC UE.

Finally, the method 800 ends at step S840.

Figure 9:
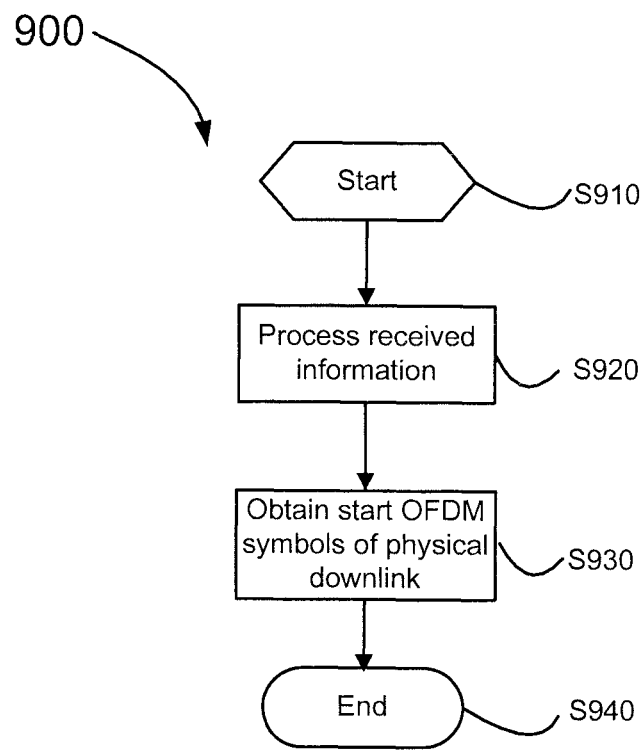
FIG. 9 is a flowchart illustrating a method in a UE for obtaining start OFDM symbols according to the present disclosure.

FIG. 9 is a flowchart illustrating a method in a UE for obtaining start OFDM symbols according to the present disclosure. As shown in FIG. 9, the method 900 starts with step S910.

At step S920, the UE processes information to be transmitted. In particular, the UE processes received SIB, paging information, RAR and user data, received downlink control information, and received MIB.

At step S930, the UE obtains start OFDM symbols of physical downlink channels. In particular, a start OFDM symbol of a PDSCH carrying SIB, $1_{SIBStart}$, a start OFDM symbol of a PDSCH carrying paging information, $1_{PagingStart}$, a start OFDM symbol of a PDSCH carrying a random access response, $1_{Msg2Start}$, a start OFDM symbol of a PDSCH carrying user data, $1_{DataStart}$, and a start OFDM symbol of a common or dedicated M-PDCCH (EPDCCH), $1_{MPDCCHStart}$.

Finally, the method 900 ends at step S940.

It can be appreciated that the above embodiments of the present disclosure can be implemented in software, hardware or any combination thereof. For example, the internal components of the base station and the UE in the above embodiments can be implemented using various devices including, but not limited to, analog circuit device, digital circuit device, Digital Signal Processing (DSP) circuit, programmable processor, Application Specific Integrated Circuit (ASIC), Field Programmable Gate Array (FPGA), Programmable Logic Device (CPLD) and the like.

Further, the embodiments of the present disclosure can be implemented in computer program products. More specifically, a computer program product can be a product having a computer readable medium with computer program logics coded thereon. When executed on a computing device, the computer program logics provide operations for implementing the above solutions according to the present disclosure. When executed on at least one processor in a computing system, the computer program logics cause the processor to perform the operations (methods) according to the embodiments of the present disclosure. This arrangement of the present disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules. The software, firmware or arrangement can be installed in a computing device to cause one or more processors in the computing device to perform the solutions according to the embodiments of the present disclosure.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A User Equipment, comprising:
reception circuitry configured to receive a Machine Type Communication Physical Downlink Control Channel (MPDCCH) and Physical Downlink Shared Channels (PDSCHs), wherein
for a PDSCH carrying First System Information Broadcast (SIB1), a starting Orthogonal Frequency Division Multiplexing (OFDM) symbol for a SIB1 transmission is determined based on information included in a Master Information Block (MIB),
for other PDSCHs, starting OFDM symbols are configured by the SIB1, and
for the MPDCCH, a starting OFDM symbol is configured by the SIB1.

2. The User Equipment according to claim 1, wherein values of the starting OFDM symbols for the other PDSCHs and a value of the starting OFDM symbol for the MPDCCH are the same.

3. A base station, comprising:
transmission circuitry configured to transmit a Machine Type Communication Physical Downlink Control Channel (MPDCCH) and Physical Downlink Shared Channels (PDSCHs), wherein
for a PDSCH carrying First System Information Broadcast (SIB1), a starting Orthogonal Frequency Division Multiplexing (OFDM) symbol for a SIB1 transmission is determined based on information included in a Master Information Block (MIB),
for other PDSCHs, starting OFDM symbols are configured by the SIB1, and
for the MPDCCH, a starting OFDM symbol is configured by the SIB1.

4. The base station according to claim 3, wherein values of the starting OFDM symbols for the other PDSCHs and a value of the starting OFDM symbol for the MPDCCH are the same.

5. A method performed by a User Equipment, comprising:
receiving a Machine Type Communication Physical Downlink Control Channel (MPDCCH) and Physical Downlink Shared Channels (PDSCHs), wherein
for a PDSCH carrying First System Information Broadcast (SIB1), a starting Orthogonal Frequency Division Multiplexing (OFDM) symbol for a SIB1 transmission is determined based on information included in a Master Information Block (MIB),
for other PDSCHs, starting OFDM symbols are configured by the SIB1, and
for the MPDCCH, a starting OFDM symbol is configured by the SIB1.

6. The method according to claim 5, wherein values of the starting OFDM symbols for the other PDSCHs and a value of the starting OFDM symbol for the MPDCCH are the same.

7. A method performed by a base station, comprising:
transmitting a Machine Type Communication Physical Downlink Control Channel (MPDCCH) and Physical Downlink Shared Channels (PDSCHs), wherein
for a PDSCH carrying First System Information Broadcast (SIB1), a starting Orthogonal Frequency Division Multiplexing (OFDM) symbol for a SIB1 transmission is determined based on information included in a Master Information Block (MIB),
for other PDSCHs, starting OFDM symbols are configured by the SIB1, and
for the MPDCCH, a starting OFDM symbol is configured by the SIB1.

8. The method according to claim 7, wherein values of the starting OFDM symbols for the other PDSCHs and a value of the starting OFDM symbol for the MPDCCH are the same.

* * * * *